US011163955B2

United States Patent
Amend et al.

(10) Patent No.: US 11,163,955 B2
(45) Date of Patent: **\*Nov. 2, 2021**

(54) IDENTIFYING NON-EXACTLY MATCHING TEXT

(71) Applicant: Bottomline Technologies (de) Inc., Portsmouth, NH (US)

(72) Inventors: Brian Amend, Rye, NH (US); Melissa Kutsch, Portsmouth, NH (US); Jessica Moran, Rye, NH (US); Sean Glerum, Portsmouth, NH (US)

(73) Assignee: Bottomline Technologies, Inc., Portsmouth, NH (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/086,993

(22) Filed: Nov. 2, 2020

(65) Prior Publication Data
US 2021/0049326 A1 Feb. 18, 2021

Related U.S. Application Data

(63) Continuation-in-part of application No. 16/877,743, filed on May 19, 2020, now Pat. No. 10,824,809,
(Continued)

(51) Int. Cl.
*G06F 40/289* (2020.01)
*G06F 40/166* (2020.01)
(Continued)

(52) U.S. Cl.
CPC .......... *G06F 40/289* (2020.01); *G06F 40/166* (2020.01); *G06F 40/189* (2020.01);
(Continued)

(58) Field of Classification Search
CPC .... G06F 40/289; G06F 40/166; G06F 40/194; G06F 40/232; G06F 40/189; G06K 9/00
See application file for complete search history.

(56) References Cited

U.S. PATENT DOCUMENTS

| 4,575,793 A | 3/1986 | Morel et al. |
| 5,228,122 A | 7/1993 | Cahn et al. |

(Continued)

FOREIGN PATENT DOCUMENTS

| EP | 1211865 A2 | 6/2002 |
| EP | 1706960 A1 | 10/2006 |

(Continued)

OTHER PUBLICATIONS

Banon, Shay, "Geo Location and Search", elastic blog post, Aug. 16, 2010, webpage found at https://www.elastic.co/blog/geo-location-and-search on Oct. 15, 2019.
(Continued)

*Primary Examiner* — Kyle R Stork
(74) *Attorney, Agent, or Firm* — Richard A. Baker, Jr.

(57) ABSTRACT

A computer-implemented method for matching user inputted text to stored text. The user inputted text is compared to each of the text strings stored in a database using a string similarity score determined using a Levenshtein distance algorithm, the n-gram or trigram methods, the Jaro-Winkler algorithm, the Cosine similarity algorithm, the Hamming distance algorithm, the Damerau-Levenshtein distance algorithm, or similar. For each comparison, the string similarity score is analyzed to determine exact matches, non-matches, and probable matches. Probable matches are further analyzed using a keyboard distance algorithm to differentiate between matches and non-matches.

20 Claims, 3 Drawing Sheets

Related U.S. Application Data which is a continuation of application No. 16/256,555, filed on Jan. 24, 2019, now Pat. No. 10,699,075, which is a continuation of application No. 15/172,571, filed on Jun. 3, 2016, now Pat. No. 10,235,356.

(51) Int. Cl.
*G06K 9/00* (2006.01)
*G06F 40/194* (2020.01)
*G06F 40/232* (2020.01)
*G06F 40/189* (2020.01)

(52) U.S. Cl.
CPC .......... *G06F 40/194* (2020.01); *G06F 40/232* (2020.01); *G06K 9/00* (2013.01)

(56) References Cited

U.S. PATENT DOCUMENTS

| | | |
|---|---|---|
| 5,559,961 A | 9/1996 | Blonder |
| 5,600,735 A | 2/1997 | Seybold |
| 5,600,835 A | 2/1997 | Garland et al. |
| 5,634,008 A | 5/1997 | Gaffaney et al. |
| 5,644,717 A | 7/1997 | Clark |
| 5,790,798 A | 8/1998 | Beckett et al. |
| 5,845,369 A | 12/1998 | Dunchock |
| 5,912,669 A | 6/1999 | Hsia |
| 5,961,592 A | 10/1999 | Hsia |
| 5,970,482 A | 10/1999 | Pham et al. |
| 6,044,401 A | 3/2000 | Harvey |
| 6,192,411 B1 | 2/2001 | Chan et al. |
| 6,205,416 B1 | 3/2001 | Butts et al. |
| 6,256,737 B1 | 7/2001 | Bianco et al. |
| 6,523,016 B1 | 2/2003 | Michalski |
| 6,651,099 B1 | 11/2003 | Dietz et al. |
| 6,675,164 B2 | 1/2004 | Kamath et al. |
| 6,687,693 B2 | 2/2004 | Cereghini et al. |
| 6,708,163 B1 | 3/2004 | Kargupta et al. |
| 6,801,190 B1 | 10/2004 | Robinson et al. |
| 6,845,369 B1 | 1/2005 | Rodenburg |
| 7,092,941 B1 | 8/2006 | Campos |
| 7,174,462 B2 | 2/2007 | Pering et al. |
| 7,308,436 B2 | 12/2007 | Bala et al. |
| 7,415,509 B1 | 8/2008 | Kaltenmark et al. |
| 7,716,129 B1 | 5/2010 | Tan et al. |
| 7,730,521 B1 | 6/2010 | Thesayi et al. |
| 7,822,598 B2 | 10/2010 | Carus et al. |
| 7,831,703 B2 | 11/2010 | Krelbaum et al. |
| 7,860,783 B2 | 12/2010 | Yang et al. |
| 7,992,202 B2 | 8/2011 | Won et al. |
| 8,229,875 B2 | 7/2012 | Roychowdhury |
| 8,229,876 B2 | 7/2012 | Roychowdhury |
| 8,392,975 B1 | 3/2013 | Raghunath |
| 8,401,867 B2 | 3/2013 | Lagadec et al. |
| 8,429,745 B1 | 4/2013 | Casaburi et al. |
| 8,433,791 B2 | 4/2013 | Krelbaum et al. |
| 8,515,862 B2 | 8/2013 | Zhang et al. |
| 8,638,939 B1 | 1/2014 | Casey et al. |
| 8,650,624 B2 | 2/2014 | Griffin et al. |
| 8,776,213 B2 | 7/2014 | McLaughlin et al. |
| 8,844,059 B1 | 9/2014 | Manmohan |
| 8,881,005 B2 | 11/2014 | Al Badrashiny et al. |
| 9,015,036 B2 | 4/2015 | Zangvil et al. |
| 9,449,346 B1 | 9/2016 | Hockey et al. |
| 9,489,627 B2 | 11/2016 | Bala |
| 9,529,678 B2 | 12/2016 | Krelbaum et al. |
| 9,537,848 B2 | 1/2017 | McLaughlin et al. |
| 9,595,023 B1 | 3/2017 | Hockey et al. |
| 9,607,103 B2 | 3/2017 | Anderson |
| 9,667,609 B2 | 5/2017 | McLaughlin et al. |
| 9,691,085 B2 | 6/2017 | Scheidelman |
| 9,798,984 B2 | 10/2017 | Paleja et al. |
| 10,037,533 B2 | 7/2018 | Caldera |
| 10,152,680 B1 | 12/2018 | Myrick et al. |
| 10,235,356 B2 | 3/2019 | Amend et al. |
| 10,242,258 B2 | 3/2019 | Guo et al. |
| 10,319,029 B1 | 6/2019 | Hockey et al. |
| 10,320,800 B2 | 6/2019 | Guo et al. |
| 10,402,817 B1 | 9/2019 | Benkreira et al. |
| 10,414,197 B2 | 9/2019 | Jesurum |
| 10,440,015 B1 | 10/2019 | Pham et al. |
| 10,467,631 B2 | 11/2019 | Dhurandhar et al. |
| 10,510,083 B1 | 12/2019 | Vukich et al. |
| 10,511,605 B2 | 12/2019 | Ramberg et al. |
| 10,523,681 B1 | 12/2019 | Bulgakov et al. |
| 10,552,837 B2 | 2/2020 | Jia et al. |
| 10,552,841 B1 | 2/2020 | Dixit |
| 10,607,008 B2 | 3/2020 | Byrne et al. |
| 10,607,228 B1 | 3/2020 | Gai et al. |
| 10,621,587 B2 | 4/2020 | Binns et al. |
| 10,699,075 B2 | 6/2020 | Amend et al. |
| 10,824,809 B2 | 11/2020 | Kutsch et al. |
| 10,909,511 B2 | 2/2021 | Chanyontpatanakul |
| 10,929,851 B2 | 2/2021 | Kang et al. |
| 11,042,555 B1 | 6/2021 | Kane et al. |
| 2002/0019945 A1 | 2/2002 | Houston et al. |
| 2002/0056043 A1 | 5/2002 | Glass |
| 2002/0065938 A1 | 5/2002 | Jungck et al. |
| 2002/0080123 A1 | 6/2002 | Kennedy et al. |
| 2002/0099649 A1 | 7/2002 | Lee et al. |
| 2002/0163934 A1 | 11/2002 | Moore et al. |
| 2003/0041042 A1 | 2/2003 | Cohen et al. |
| 2003/0083764 A1 | 5/2003 | Hong |
| 2003/0110394 A1 | 6/2003 | Sharp et al. |
| 2003/0135612 A1 | 7/2003 | Huntington et al. |
| 2003/0233305 A1 | 12/2003 | Solomon |
| 2004/0034666 A1 | 2/2004 | Chen |
| 2004/0186882 A1 | 9/2004 | Ting |
| 2004/0193512 A1 | 9/2004 | Gobin et al. |
| 2005/0021650 A1 | 1/2005 | Gusler et al. |
| 2005/0081158 A1 | 4/2005 | Hwang |
| 2005/0154692 A1 | 7/2005 | Jacobsen et al. |
| 2005/0177483 A1 | 8/2005 | Napier et al. |
| 2006/0101048 A1 | 5/2006 | Mazzagatti et al. |
| 2006/0155751 A1 | 7/2006 | Geshwind et al. |
| 2006/0190310 A1 | 8/2006 | Gudla et al. |
| 2006/0212270 A1 | 9/2006 | Shiu et al. |
| 2007/0277224 A1 | 11/2007 | Osborn et al. |
| 2008/0104007 A1 | 5/2008 | Bala |
| 2009/0059793 A1 | 3/2009 | Greenberg |
| 2009/0094677 A1 | 4/2009 | Pietraszek et al. |
| 2009/0140838 A1 | 6/2009 | Newman et al. |
| 2009/0174667 A1 | 7/2009 | Kocienda et al. |
| 2009/0201257 A1 | 8/2009 | Saitoh et al. |
| 2009/0202153 A1 | 8/2009 | Cortopassi et al. |
| 2009/0307176 A1 | 12/2009 | Jeong et al. |
| 2009/0313693 A1 | 12/2009 | Rogers |
| 2010/0066540 A1 | 3/2010 | Theobald et al. |
| 2010/0130181 A1 | 5/2010 | Won |
| 2010/0169958 A1 | 7/2010 | Werner et al. |
| 2010/0225443 A1 | 9/2010 | Bayram et al. |
| 2011/0055907 A1 | 3/2011 | Narasimhan et al. |
| 2011/0070864 A1 | 3/2011 | Karam et al. |
| 2011/0082911 A1 | 4/2011 | Agnoni et al. |
| 2011/0145587 A1 | 6/2011 | Park |
| 2011/0251951 A1 | 10/2011 | Kolkowitz et al. |
| 2011/0298753 A1 | 12/2011 | Chuang et al. |
| 2012/0041683 A1 | 2/2012 | Vaske et al. |
| 2012/0124662 A1 | 5/2012 | Baca et al. |
| 2012/0127102 A1 | 5/2012 | Uenohara et al. |
| 2012/0151553 A1 | 6/2012 | Burgess et al. |
| 2013/0071816 A1 | 3/2013 | Singh et al. |
| 2013/0117246 A1 | 5/2013 | Cabaniols et al. |
| 2013/0231974 A1 | 9/2013 | Harris et al. |
| 2013/0254115 A1 | 9/2013 | Pasa et al. |
| 2013/0339141 A1 | 12/2013 | Stibel et al. |
| 2014/0006347 A1 | 1/2014 | Qureshi et al. |
| 2014/0067656 A1 | 3/2014 | Cohen et al. |
| 2014/0149130 A1 | 5/2014 | Getchius |
| 2014/0366159 A1 | 12/2014 | Cohen |
| 2015/0039473 A1 | 2/2015 | Hu et al. |
| 2015/0220509 A1 | 8/2015 | Karov Zangvil et al. |
| 2015/0264573 A1 | 9/2015 | Giordano et al. |
| 2015/0348041 A1 | 12/2015 | Campbell et al. |

(56) References Cited

U.S. PATENT DOCUMENTS

| | | |
|---|---|---|
| 2016/0041984 A1 | 2/2016 | Kaneda et al. |
| 2016/0352759 A1 | 12/2016 | Zhai |
| 2017/0039219 A1 | 2/2017 | Acharya |
| 2017/0068954 A1 | 3/2017 | Hockey et al. |
| 2017/0070500 A1 | 3/2017 | Hockey et al. |
| 2017/0154382 A1 | 6/2017 | McLaughlin et al. |
| 2017/0163664 A1 | 6/2017 | Nagalla et al. |
| 2017/0177743 A1 | 6/2017 | Bhattacharjee et al. |
| 2017/0300911 A1 | 10/2017 | Alnajem |
| 2018/0107944 A1 | 4/2018 | Lin et al. |
| 2018/0349924 A1 | 12/2018 | Shah et al. |
| 2019/0014101 A1 | 1/2019 | Hockey et al. |
| 2019/0182233 A1 | 6/2019 | Hockey et al. |
| 2019/0197189 A1 | 6/2019 | Studnicka |
| 2019/0228411 A1 | 7/2019 | Hernandez-Ellsworth et al. |
| 2019/0318122 A1 | 10/2019 | Hockey et al. |
| 2019/0347281 A1 | 11/2019 | Natterer |
| 2019/0349371 A1 | 11/2019 | Smith et al. |
| 2019/0373001 A1 | 12/2019 | Deeb et al. |
| 2020/0019964 A1 | 1/2020 | Miller et al. |
| 2020/0117800 A1 | 4/2020 | Ramberg et al. |

FOREIGN PATENT DOCUMENTS

| | | |
|---|---|---|
| EP | 2653982 A1 | 10/2013 |
| EP | 2636149 A4 | 10/2016 |
| IL | 176551 A | 9/2012 |
| IN | 219405 | 3/2007 |
| KR | 100723738 B1 | 5/2007 |
| TW | 201723907 A | 7/2017 |
| WO | 01/25914 A2 | 4/2001 |
| WO | 02/87124 A1 | 10/2002 |
| WO | 2002/100039 A2 | 12/2002 |
| WO | 03/73724 A2 | 9/2003 |
| WO | 2005/067209 A1 | 7/2005 |
| WO | 2012/061701 A1 | 5/2012 |
| WO | 2014/145395 A2 | 9/2014 |
| WO | 2017/096206 A1 | 6/2017 |
| WO | 2017/209799 A1 | 12/2017 |

OTHER PUBLICATIONS

Bansal, Nikhil, Avrim Blum, and Shuchi Chawla. "Correlation clustering." Machine Learning 56.1-3 (2004): 89-113.
Bottomline Technologies, Bottomline Cyber Fraud & Risk Management:Secure Payments, marketing brochure.
Brasetvik, Alex, "Elasticsearch from the Bottom up, Part 1", Elastic, Sep. 16, 2013. Webpage found at https://www.elastic.co/blog/found-elasticsearch-from-the-bottom-up on Jun. 17, 2019.
Co-pending U.S. Appl. No. 13/135,507, filed Jul. 7, 2011.
Dalit Amitai, Shahar Cohen, Yulia Mayer, and Avital Seraty, "Fraud Detection Rule Optimization", U.S. Appl. No. 16/985,773, filed Aug. 5, 2020.
EMV Payment Tokenisation Specification, Technical Framework, EMVCo, LLC, Version 2.1, Jun. 2019.
Experian, "Fuzzy address searching", webpage downloaded from https://www.edq.com/glossary/fuzzy-address-searching/ on Oct. 8, 2019.
Fenz, Dustin, et al., "Efficient Similarity Search in Very Large String Sets", conference paper, Jun. 2012.
Finley, Thomas, and Thorsten Joachims. "Supervised clustering with support vector machines." Proceedings of the 22nd international conference on Machine learning, ACM, 2005.
G. Kou, Y. Peng, Y. Shi, M. Wise, W. Xu, Discovering credit cardholders behavior by multiple criteria linear programming, Annals of Operations Research 135, (2005) 261-274.
Haydn Shaughnessy, Solving the $190 billion Annual Fraud Problem: More on Jumio, Forbes, Mar. 24, 2011.
IdentityMing, Accelerated Fintech Compliance and Powerful Online Fraud Prevention Tools, website found at https://identitymindglobal.com/momentum/ on Dec. 12, 2018.
International Search Report and Written Opinion received for PCT Patent Application No. PCT/IL05/000027, dated Jun. 2, 2005, 8 pages.
International Search Report and Written Opinion received for PCT Patent Application No. PCT/US17/13148, dated May 19, 2017, 11 pages.
International Search Report for corresponding International Application No. PCT/US2016/064689 dated Feb. 22, 2017.
Jeremy Olshan, How my bank tracked me to catch a thief, MarketWatch, Apr. 18, 2015.
Meia et al., Comparing clusterings—an information based distance, Journal of Multivariate Analysis 98 (2007) 873-895.
Mitchell, Stuart, et al, "pulp Documentation", Release 1.4.6, Jan. 27, 2010.
Oracle(Registered)Warehouse Builder Data Modeling, ETL, and Data Quality Guide, Chapter 23, 11g Release 2 (11.2), Part No. E10935-04, Aug. 2011, web page downloaded from https://docs.oracle.com/cd/E24693_01/owb.11203/e10935/match_merge.htm on Apr. 16, 2020.
Postel et al.; "Telnet Protocol Specification" RFC 854; entered into the case on Apr. 18, 2013.
RodOn, "location extraction with fuzzy matching capabilities", Blog post on StackOverflow.com, Jul. 8, 2014, webpage downloaded from https://stackoverflow.com/questions/24622693/location-extraction-with-fuzzy-matching-capabilities on Oct. 8, 2019.
Rosette Text Analytics, "An Overview of Fuzzy Name Matching Techniques", Blog, Dec. 12, 2017, webpage downloaded from https://www.rosette.com/blog/overview-fuzzy-name-matching-techniques/ on Oct. 15, 2019.
Samaneh Soroumejad, Zahra Zojaji, Reza Ebrahimi Atani, Amir Hassan Monadjemi, "A Survey of Credit Card Fraud Detection Techniques: Data and Technique Oriented Perspective", 2016.
Schulz, Klaus and Stoyan Mihov, "Fast String Correction with Levenshtein-Automata", IJDAR (2002) 5: 67. https://doi.org/10.1007/S10032-002-0082-8.
The Telnet Protocol Microsoft Knowledgebase; entered into the case on Apr. 18, 2013.
Wikil Kwak, Yong Shi, John J. Cheh, and Heeseok Lee, "Multiple Criteria Linear Programming Data Mining Approach: An Application for Bankruptcy Prediction",: Data Mining and Knowledge Management, Chinese Academy of Sciences Symposium, 2004, LNAI 3327, pp. 164-173, 2004.
Wikipedia, "Autoencoder", web page downloaded from http://en.wikipedia.org/wiki/Autoencoder on Dec. 18, 2020.
Written Opinion of the International Searching authority for corresponding International Application No. PCT/US2016/064689 dated Feb. 22, 2017.
Appaloosa Store, "String Similarity Algorithms Compared", Apr. 5, 2018, webpage downloaded on Oct. 20, 2020 from https://medium.com/@appaloosastore/string-similarity-algorithms-compared-3f7b4d12f0ff.
Vogler, Raffael, "Comparison of String Distance Algorithms", Aug. 21, 2013, webpage downloaded on Oct. 20, 2020 from https://www.joyofdata.de/blog/comparison-of-string-distance-algorithms.
Wikipedia, "Damerau-Levenshtein distance", webpage downloaded on Oct. 20, 2020 from https://en.wikipedia.org/wiki/Damerau-Levenshtein_distance.

IDENTIFYING NON-EXACTLY MATCHING TEXT

PRIOR APPLICATION

This application is a continuation-in-part application of U.S. patent application Ser. No. 16/877,743, "Method for Identifying Non-exactly Matching Text", filed on May 19, 2020, now U.S. Pat. No. 10,824,809, issued on Nov. 3, 2020, the entire patent incorporated herein by reference. U.S. patent application Ser. No. 16/877,743 is a continuation application of U.S. patent application Ser. No. 16/256,555, "Apparatus and Method for Identifying Text that does not Match Exactly using Dual Authentication", filed on Jan. 24, 2019, now U.S. Pat. No. 10,699,075, issued Jun. 30, 2020, the entire patent incorporated herein by reference. U.S. patent application Ser. No. 16/256,555 is a continuation of U.S. patent application Ser. No. 15/172,571, "Dual Authentication Method for Identifying Non-Exactly Matching Text", filed on Jun. 3, 2016, now U.S. Pat. No. 10,235,356, issued May 19, 2019, the entire patent incorporated herein by reference.

BACKGROUND

Technical Field

The present inventions relate to artificial intelligence, data processing, and, more particularly, to a method and system for identifying non-exactly matching text in electronic data.

Description of the Related Art

A comparison of human entered data to stored electronic data occurs frequently in many different industries. For example, patients fill out forms when entering walk-in facilities (e.g., an emergency room) and these paper forms are later entered into an electronic database. Entry of information contained in forms that were filled out by hand is frequently error-prone due to numerous factors. For example, the information may be incorrectly filled out (e.g., misspellings, etc.) or the individual entering the information may not be able to read the information written on the form (e.g., due to the handwriting of the individual that filled out the form).

Incorrectly entering text into a database may result in duplicate entries for one individual in a database. For example, if there already exists an entry for Jonathan Smith at 123 Main Street and information is entered for Jon Smith at 123 Main Street, then a new user entry may mistakenly be added to the database instead of using the existing entry for Jonathan Smith at 123 Main Street. This may cause database errors or inconsistencies in the future.

SUMMARY OF THE INVENTIONS

Current methods for matching user-inputted data to stored data are insufficient at differentiating between new entries to a database and existing database entries that are spelled differently, use abbreviations, etc. A new method is needed for matching user-inputted data to stored data.

The present disclosure provides a computer-implemented method for matching user inputted text to stored text using a dual authentication method based on a string similarity algorithm and a keyboard distance algorithm.

According to one aspect, there is provided a computer-implemented method for matching user inputted text to stored text. The method includes: receiving the user inputted text, accessing a database including a plurality of text strings and stored on a non-transitory computer-readable medium, and comparing the user inputted text to the plurality of text strings to determine potential matches between the user inputted text and the plurality of text strings. The comparing includes, for each text string of the plurality of text strings, determining a Levenshtein distance between the user inputted text and the text string. A Levenshtein distance of zero indicates that the user inputted text and the text string are an exact match and a Levenshtein distance greater than zero indicates that the user inputted text and the text string are not an exact match and the number of differences between the text string and the user inputted text. When the determined Levenshtein distance is greater than zero but less than a maximum difference threshold, at least one character differing between the user inputted text and the text string is determined. The determined at least one differing character includes a mismatching character pair including a mismatching character in the text string and a corresponding mismatching character in the user inputted text. For each mismatching character pair, a keyboard distance between the mismatching character in the text string and the corresponding mismatching character in the user inputted text is determined. The keyboard distance corresponds to a physical distance on a keyboard between the two mismatching characters. When the keyboard distance determined for each mismatching character pair is less than a maximum keyboard distance threshold, the user inputted text and the text string are identified as a match. When the determined Levenshtein distance is zero, the user inputted text and the text string are identified as a match. When the determined Levenshtein distance is greater than the maximum difference threshold, the text string is identified as not a match to the user inputted text. The method also includes outputting information regarding whether the user inputted text matches any of the plurality of text strings.

Alternatively or additionally, during comparison of the user inputted text and the plurality of text strings, the user inputted text and the text string are segmented into individual words, and the Levenshtein distance is determined for the individual words separately.

Alternatively or additionally, the Levenshtein distance is determined for each word of the user inputted text with respect to each word of the text string to determine an optimal matching of the words in the user inputted text to the words in the text string such that the sum of the Levenshtein distance for the optimal matching is a minimum compared to the sum of the Levenshtein distance for other matching of the user inputted text and the text string.

Alternatively or additionally, determining the optimal matching including combining one or more of the words in the user inputted text and the words in the text string.

Alternatively or additionally, the user inputted text and each of the plurality of text strings include multiple strings corresponding to multiple fields. Each string of the multiple strings corresponds to a field of the multiple fields. Comparing the user inputted text to the plurality of text strings includes comparing the user inputted text in a given text field to the text string in the same given text field.

Alternatively or additionally, the maximum difference threshold and/or the maximum keyboard distance threshold is increased based on the number of different fields in which a match is found between the user inputted text and the text string.

Alternatively or additionally, the method also includes accessing a secondary database storing a plurality of synonyms stored on the non-transitory computer-readable medium. Each synonym comprises a replacement string corresponding to a main string. Comparing the user inputted text and the text string further includes generating at least one replacement text string. The at least one replacement text string is generated by replacing at least one portion of the text string that matches a main string with the corresponding replacement string. The user inputted text and the text string are determined to match if the user inputted text matches either the stored text or the at least one replacement text string.

Alternatively or additionally, the user inputted text and each of the plurality of text strings include multiple strings corresponding to multiple fields. Each string of the multiple strings corresponds to a field of the multiple fields. Comparing the user inputted text to the plurality of text strings includes comparing the user inputted text in a given text field to the text string in the same given text field. When a total number of fields in which an exact match is found between the user inputted text, any field in which the user inputted text is determined to match the text string and the match is not an exact match, the user inputted text for the field is stored as a synonym for the text string for the field.

Alternatively or additionally, prior to identifying the user inputted text and the text string as a match when the keyboard distance determined for each mismatching character pair is less than the maximum keyboard distance threshold, determining whether a sum of all of the keyboard distances determined for each mismatching character pair is less than a maximum total keyboard distance threshold and, only when the sum of all of the keyboard distances is less than the maximum total keyboard distance threshold, identifying the user inputted text and the text string as a match.

Alternatively or additionally, for a given mismatching character pair, either the mismatching character in the text string or the corresponding mismatching character in the user inputted text comprises a missing character.

Alternatively or additionally, for the given mismatching character pair including the missing character and a non-missing character, the keyboard distance between the missing character and the non-missing character comprises the distance between the non-missing character and a character adjacent to the non-missing character. The adjacent character is from the user inputted text when the non-missing character is from the user inputted text or the text string when the non-missing character is from the text string.

Alternatively or additionally, the keyboard distance between the non-missing character and the adjacent character comprises the minimum of the distance between the non-missing character and a character immediately preceding the non-missing character or a character immediately following the non-missing character.

Alternatively or additionally, for the given mismatching character pair including the missing character and a non-missing character, the keyboard distance between the missing character and the non-missing character is set equal to a predetermined value.

Alternatively or additionally, the comparison further includes, within the user inputted text, combining two characters into a single character to account for a user mistakenly hitting two keys when attempting to press one key when the two characters are located adjacent one another on the keyboard and the two characters are located adjacent to one another in the user inputted text.

Alternatively or additionally, the keyboard distance between the combined two characters and the other character in the mismatching character pair is equal to the minimum of the keyboard distance between a first of the two combined characters and the other character in the mismatching character pair; and the keyboard distance between a second of the two combined characters and the other character in the mismatching character pair.

Alternatively or additionally, a capitalized character is split into two characters equal to the shift key and a lower case version of the capitalized character.

Alternatively or additionally, when the user inputted text is identified as a match to a particular text string of the plurality of text strings, data included with the user inputted text is stored as associated with the particular text string.

Alternatively or additionally, when the user inputted text is identified as not matching any of the plurality of text strings, storing the user inputted text as a new text string of the plurality of text strings.

Alternatively or additionally, data included with the user inputted text is stored as associated with the new text string.

Alternatively or additionally, when the determined Levenshtein distance is zero, identifying the user inputted text and the text string as an exact match and, when the determined Levenshtein distance is greater than zero but less than a maximum difference threshold and the keyboard distance determined for each mismatching character pair is less than a maximum keyboard distance threshold, identifying the user inputted text and the text string as a probable match.

Alternatively or additionally, the maximum difference threshold and/or the maximum keyboard distance threshold is adjusted based on the length of the user inputted text, such that user inputted text having a longer length has a larger maximum difference threshold and/or maximum keyboard distance threshold than user inputted text having a shorter length.

Alternatively or additionally, when the user inputted text and the text string are identified as a match, the comparing of the user inputted text to the plurality of text strings is stopped.

Alternatively or additionally, when the user inputted text and the text string are identified as a match, the comparing of the user inputted text to the plurality of text strings continues.

Alternatively or additionally, the case of the user inputted text and the text strings is ignored during comparison.

According to another aspect, there is provided a device for matching user inputted text to stored text. The device includes a non-transitory computer-readable medium storing a database including a plurality of text strings and a processor. The processor is configured to: receive the user inputted text, access the database including the plurality of text strings, and compare the user inputted text to the plurality of text strings to determine potential matches between the user inputted text and the plurality of text strings. The comparing includes, for each text string of the plurality of text strings, determining a Levenshtein distance between the user inputted text and the text string. A Levenshtein distance of zero indicates that the user inputted text and the text string are an exact match and a Levenshtein distance greater than zero indicates that the user inputted text and the text string are not an exact match and the number of differences between the text string and the user inputted text. When the determined Levenshtein distance is greater than zero but less than a maximum difference threshold, at least one character differing between the user inputted text and the text string is determined. The determined at least one differing character comprises a mismatching character pair including a mismatching character in the text string and a corresponding mismatching character in the user inputted text. For each mismatching character pair, a keyboard distance between the mismatching character in the text string and the corresponding mismatching character in the user inputted text is determined. The keyboard distance corresponds to a physical distance on a keyboard between the two mismatching characters. When the keyboard distance determined for each mismatching character pair is less than a maximum keyboard distance threshold, the user inputted text, and the text string are identified as a match. When the determined Levenshtein distance is zero, the user inputted text and the text string are identified as a match. When the determined Levenshtein distance is greater than the maximum keyboard difference threshold, the text string is identified as not a match to the user inputted text. The processor is also configured to output information regarding whether the user inputted text matches any of the plurality of text strings.

A number of features are described herein with respect to embodiments of this disclosure. Features described with respect to a given embodiment also may be employed in connection with other embodiments.

Another aspect involves a method for matching an input text to stored text. The method is made up of (1) accessing a database including a plurality of text strings, and (2) comparing the input text to the plurality of text strings to determine potential matches between the input text and the plurality of text strings. The comparing is made up of (2a) looping through each text string of the plurality of text strings, (2b) determining a string similarity score between the input text and the text string. When (2b1) the string similarity score indicates an exact match, identifying the input text and the text string as matching. When (2b2) the string similarity score is greater than or equal to a string similarity threshold, continuing looping with a next text string. When (2b3) the string similarity score is greater than zero but less than the string similarity threshold, (2b3a) determining at least one character differing between the input text and the text string, wherein the at least one differing character comprises a mismatching character pair including a mismatching character in the text string and a corresponding mismatching character in the input text; and (2b3b) for each mismatching character pair, determine a keyboard distance between the mismatching character in the text string and the corresponding mismatching character in the input text, wherein the keyboard distance corresponds to a physical distance on a keyboard between the two mismatching characters. When (2b3b 1), for a given mismatching character pair, either the mismatching character in the text string or the corresponding mismatching character in the input text comprises a missing character, and the given mismatching character pair including the missing character and a non-missing character, the keyboard distance is a distance between the missing character and the non-missing character comprises the distance between the non-missing character and a character adjacent to the non-missing character; and (2b3b2) when the keyboard distance determined for each mismatching character pair is less than a maximum keyboard distance threshold, identifying the input text and the text string as matching. When (2c) all of the text strings are compared without a match to the input text, identifying the input text as non-matching.

The string similarity score could be calculated using a Levenshtein distance algorithm, Damerau-Levenshtein distance algorithm, a Jaro-Winkler algorithm, a Cosine similarity algorithm, the n-gram or trigram methods, the Hamming distance algorithm, or any combination thereof. The string similarity could be used in conjunction with the Word Mover's Distance algorithm. The identifying of the input text and the text string as matching could further comprises returning a confidence score, which may be an average or a sum of the string similarity score and the keyboard distance. The identifying of the input text and the text string as matching could further comprises returning a tri-state value. In some embodiments, the keyboard distance between the non-missing character and the adjacent character is made up of a minimum of the distance between the non-missing character and the adjacent character immediately preceding the non-missing character or the adjacent character immediately following the non-missing character. The given mismatching character pair may include the missing character and the non-missing character, the keyboard distance between the missing character and the non-missing character is set equal to a predetermined value. In some embodiments, the comparing further includes, within the input text, combining two characters into a single character to account for a user mistakenly hitting two keys when attempting to press one key when the two characters are located adjacent to one another on the keyboard and the two characters are located adjacent to one another in the input text.

An apparatus for improving automated matching of user inputted text to a database of text strings is another aspect. The apparatus is made up of an input device configured to receive the user inputted text; a memory electrically connected to the input device, said memory storing the user inputted text and the database of the text strings; and a processor, electrically connected to the memory and to the input device. The processor is configured to accept the user inputted text and place the user inputted text in the memory, and then loop through each text string in the database, comparing a string similarity score between the text string and the user inputted text. If the string similarity score indicates an exact match, a match is outputted by the processor. If the string similarity score is greater than or equal to a string similarity threshold, continuing the loop of each text string with the next text string in the database. If the string similarity score is less than the string similarity threshold, looping through each character of the text string and the user inputted text until a mismatch between a text string character and a user inputted text character is found, and determining a keyboard distance between the text string character and the user inputted text character. If the keyboard distance is greater than or equal to a keyboard distance threshold, continuing the loop of each text string with the next text string in the database. If the keyboard distance is less than the keyboard distance threshold, continuing the loop through each character of the text string and the user inputted text, until each character of the text string and the user inputted text has been compared, upon which the match is outputted by the processor. Continue looping through each text string until each text string in the database is compared, upon which a non-match is outputted by the processor.

In the apparatus, before identifying the user inputted text and the text string as the match when the keyboard distance, the processor could determine for each mismatching character pair is less than a maximum keyboard distance threshold, determining whether a sum of all of the keyboard distances determined for each mismatching character pair is less than a maximum total keyboard distance threshold and, only when the sum of all of the keyboard distances is less than the maximum total keyboard distance threshold, identifying the user inputted text and the text string as the match. The apparatus could also perform a comparison between the text string character and the user inputted text character that further includes combining two characters within the user inputted text into a single character to account for the user mistakenly hitting two keys when attempting to press one key when the two characters are located adjacent one another on the keyboard and the two characters are located adjacent to one another in the user inputted text.

For a better understanding of the present disclosure, together with other and further aspects thereof, reference is made to the following description, taken in conjunction with the accompanying drawings. The scope of the disclosure is set forth in the appended claims, which set forth in detail certain illustrative embodiments. These embodiments are indicative, however, of but a few of the various ways in which the principles of the disclosure may be employed.

DETAILED DESCRIPTION

Figure 1:
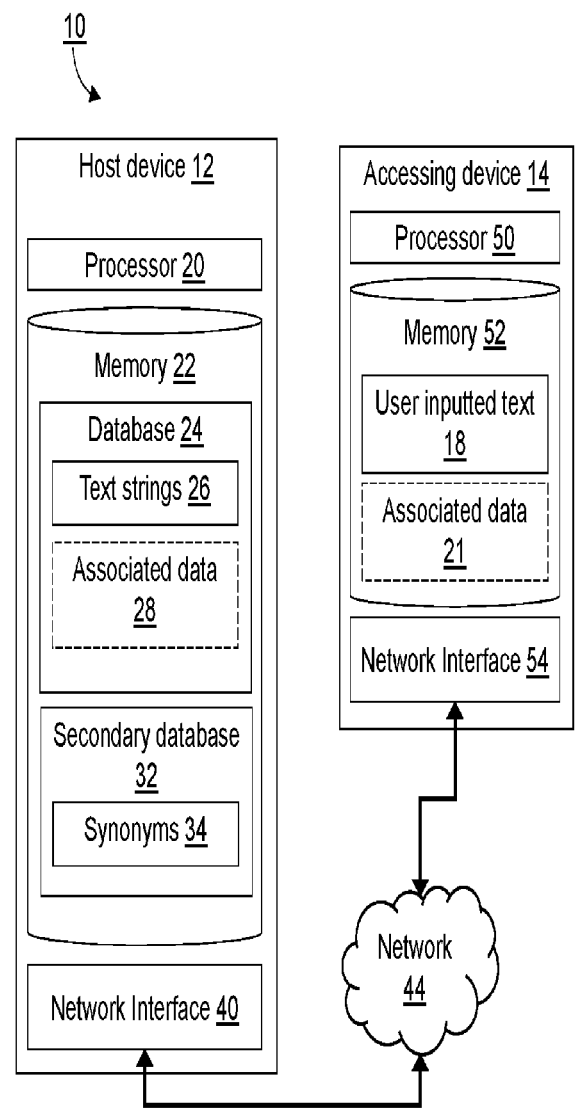
FIG. 1 is a block diagram representing a system for entering user inputted text into a database.

The present inventions are now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should be appreciated that many of the elements discussed in this specification may be implemented in a hardware circuit(s), a processor executing software code or instructions which are encoded within computer-readable media accessible to the processor, or a combination of a hardware circuit(s) and a processor or control block of an integrated circuit executing machine-readable code encoded within a computer-readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer-readable media, or a combination of a hardware circuit(s) and a processor and/or control block executing such code.

A computer-implemented method for matching user inputted text to stored text is provided. The user inputted text is compared to each of the text strings stored in a database using a string similarity distance algorithm. For each comparison, the string similarity is analyzed to determine exact matches, non-matches, and probable matches. Probable matches are further analyzed using a keyboard distance algorithm to segment the probable matches into matches or non-matches.

While the discussion herein uses the term "user inputted text", in some embodiments the text is scanned in with a scanner or camera, or entered through a microphone through to dictation or voice recognition software. In still another embodiment, the "user inputted text" is from a file containing one or a plurality of text entries to compare. In still another embodiment, the stored text is compared to itself to remove duplicates. In this embodiment, the first stored text may be used to compare to every other stored text entry in the stored text. Then, the second stored text is compared to stored text entries 3 through the end of the list, etc. When a match is found, the records are combined or one is deleted.

FIG. 1 depicts a system 10 for matching user inputted text to stored text. The system 10 includes a host device 12 and an accessing device 14. The host device 12 includes a processor 20 and a memory 22 storing a database 24. The database 24 stores a plurality of text strings 26. The host device 12 may additionally include a network interface 40 for receiving user inputted text 18 (input text) from the accessing device 14 via a network 44.

The processor 20 of the host device 12 is configured to receive the user inputted text 18. As described above, the user inputted text 18 may be received by a network interface 40 of the host device 12. Alternatively, the user inputted text 18 may be inputted into the host device 12 via a keyboard (not shown) or using any suitable input device.

After receiving the user inputted text 18, the processor 20 is configured to access the database 24 including the plurality of text strings 24. In FIG. 1, the processor 20 and the memory 22 (that the database 24 is stored on) are components of the same host device 12. However, as will be understood by one of ordinary skill in the art, the database 24 may be stored on a separate device (e.g., a server) or in an external memory attached to the host device 12 (e.g., an external hard drive or network-attached storage).

The processor 20 is configured to compare the user inputted text 18 to the plurality of text strings 26 stored in the database 24 to determine potential matches between the user inputted text 18 and the plurality of text strings 26. For each text string of the plurality of text strings 26, the processor 20 compares the user inputted text 18 to the text string 26 by determining a string similarity score between the user inputted text 18 and the text string 26. A string similarity score of zero indicates that the user inputted text 18 and the text string 26 are an exact match and a string similarity score greater than zero indicates that the user inputted text 18 and the text string 26 are not an exact match. The number of differences between the text string 26 and the user inputted text 18 is indicated by the string similarity score. In some embodiments, when determining the string similarity score, the case of the user inputted text 18 and the text strings 26 may be ignored.

Figure 2A:
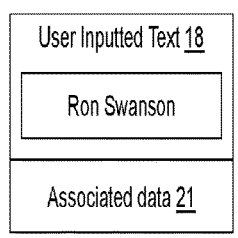
FIGS. 2A and 2B are examples of human entered text and text strings stored in a database.
Figure 2A:
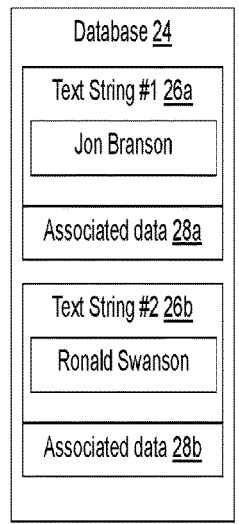

For example, FIG. 2A depicts the comparison of "Ron Swanson" to "Jon Branson" and "Ronald Swanson." The following text shows with underlines the three letters that are different in "Ron Swanson" and "Jon Branson": Ron Swanson; Jon Branson. Like "Jon Branson", "Ronald Swanson" also differs from "Ron Swanson" by three letters as shown with underlines in the following text: Ron Swanson; Ronald Swanson. In both of these examples, the Levenshtein distance between the user inputted text and the text strings is three.

As will be understood by one of ordinary skill in the art, while the above example increases the Levenshtein distance by one for each character mismatch, the string similarity score may be determined in any suitable manner that represents the differences between the text string 26 and the user inputted text 18. For example, the Levenshtein distance may increase by 0.5 for mismatches between capital and lower case letters and 1.0 for all other mismatches.

It may be preferable to ensure that one missing character (e.g., "a" in "Ronld") does not result in the Levenshtein distance algorithm counting each character following the missing as not matching (e.g., "Ronald Swanson" and "Ronld Swanson" could be determined to only match the first three characters because the position of the characters in "Ld Swanson" does not match the position of any of the characters in "ald Swanson"). For this reason, during comparison of the user inputted text 18 and the plurality of text strings 26, the user inputted text 18, and the text string 26 may be segmented into individual words and the Levenshtein distance may be determined for the individual words separately.

It is possible that the user inputted text 18 may include errant spaces that mistakenly divide one word into two separate words and/or may be missing spaces (e.g., due to a user failing to hit the space key) that results in two words being presented as one word. For example, when typing "Ronald", a user may mistakenly push the space key instead of "n" and result in "Ro ald". For this reason, determining the optimal matching may additionally include combining one or more of the words in the user inputted text 18 and the words in the text string 26. For example, when comparing "Ronald Swanson" and "Ro ald Swanson", "Ronald" may be separately compared to each of "Ro", "ald", "Swanson", "Ro ald", "Ro ald Swanson", and "ald Swanson".

For the reasons described above, the string similarity score may alternatively or additionally be determined for each word of the user inputted text 18 with respect to each word of the text string 26 to determine an optimal matching of the words in the user inputted text 18 to the words in the text string 26 such that the sum of the string similarity score for the optimal matching is a minimum compared to the sum of the string similarity score for other matching of the user inputted text 18 and the text string 26.

The string similarity score could be calculated using one or more of several string similarity algorithms: the Levenshtein distance algorithm, the n-gram or trigram methods, the Jaro-Winkler algorithm, the Cosine similarity algorithm, the Hamming distance algorithm, the Damerau-Levenshtein distance algorithm, or similar techniques. These algorithms could be used independently to calculate the string similarity score or a plurality of these algorithms could be used and the results summed or averaged (or similarly combined). These algorithms could also be combined with the Word Mover's Distance to substitute word with synonyms. For instance, "Ave." could be replaced with "Avenue", "St" with "Street", or "NH" with "New Hampshire". This is typically done with a machine learning trained algorithm that assigns various synonomys to a common term for use, e.g. changing "MA", "MA.", "Ma", "Ma.", "Mass", "Mass.", etc into "Massachusetts".

The Levenshtein distance is the minimum number of single-character edits (insertions, deletions, or replacements) required to change one word into the other. The result is a positive integer, sensitive to string length. The Levenshtein distance between two strings a,b (of length |a| and |b| respectively) is given by $lev_{a,b}(|a|,|b|)$, as defined by the following recursive formula:

$$lev_{a,b}(i,j) = \begin{cases} \max(i,j) & \text{if } \min(i,j) = 0 \\ \min \begin{cases} lev_{a,b}(i-1,j)+1 \\ lev_{a,b}(i,j-1)+1 \\ lev_{a,b}(i-1,j-1)+1_{(a_i \neq b_j)} \end{cases} & \text{otherwise} \end{cases}$$

where $1_{(ai \neq bj)}$ is the indicator function equal to 0 when $a_i = b_j$ and equal to 1 otherwise, and $lev_{a,b}(i,j)$ is the distance between the first i characters of a and the first j characters of b. i and j are 1-based indices.

The Damerau-Levenshtein distance algorithm is like the Levenshtein distance, but transposition of adjacent symbols is allowed, in addition to insertions, deletions, or replacements. The Damerau-Levenshtein distance between two words is the minimum number of operations (consisting of insertions, deletions, or substitutions of a single character, or transposition of two adjacent characters) required to change one word into the other. The recursive formula for the Damerau-Levenshtein is:

$$dlev_{a,b}(i,j) = \min \begin{cases} 0 & \text{if } i = j = 0 \\ dlev_{a,b}(i-1,j)+1 & \text{if } i > 0 \\ dlev_{a,b}(i,j-1)+1 & \text{if } j > 0 \\ dlev_{a,b}(i-1,j-1)+1_{(a_i \neq b_j)} & \text{if } i,j > 0 \\ dlev_{a,b}(i-2,j-2)+1 & \text{if transversed( )} \end{cases}$$

Where: tranversed( ) means i,j>1 and a[i]=b[j-1] and a[i-1]=b[j].

$1_{(ai \neq bj)}$ is the indicator function equal to 0 when $a_i = b_j$ and equal to 1 otherwise An n-gram or trigram algorithms are a contiguous sequence of n (three, in the trigram case) items from a given sample. To measure similarity the number of matching n-grams in both strings is divided by the number of unique n-grams. n-grams can also be used for efficient approximate matching. By converting a sequence of items to a set of n-grams, it can be embedded in a vector space, thus allowing the sequence to be compared to other sequences efficiently. For example, if we convert strings with only letters in the English alphabet into single character 3-grams, we get a $26^3$-dimensional space (the first dimension measures the number of occurrences of "aaa", the second "aab", and so forth for all possible combinations of three letters). Using this representation, we lose information about the string. For example, both the strings "abc" and "bca" give rise to exactly the same 2-gram "bc" (although {"ab", "bc"} is clearly not the same as {"bca", "ca"}). However, we know empirically that if two strings of real text have a similar vector representation (as measured by cosine distance) then they are likely to be similar. Other metrics have also been applied to vectors of n-grams with varying, sometimes better, results. For example, z-scores have been used to compare documents by examining how many standard deviations each n-gram differs from its mean occurrence in a large collection, or text corpus, of documents (which form the "background" vector). In the event of small counts, the g-score (also known as g-test) may give better results for comparing alternative models.

The Cosine similarity algorithm measures the similarity of two non-zero vectors, typically the n-gram vectors described above. Given vectors A and B, the formula for the similarity of the two vectors is:

$$\text{similarity} = \cos\theta = \frac{\sum_{i=1}^{n} A_i B_i}{\sqrt{\sum_{i=1}^{n} A_i^2} \sqrt{\sum_{i=1}^{n} B_i^2}}$$

The Jaro-Winkler distance is a string metric for measuring the edit distance between two sequences. The Jaro distance between two words is the minimum number of single-character transpositions required to change one word into the other. The Jaro-Winkler distance uses a prefix scale which gives more favorable ratings to strings that match from the beginning for a set prefix length. The Jaro Distance between two sequences s1 and s2 is defined by:

$$d_j = \frac{1}{3}\left(\frac{m}{|s_1|} + \frac{m}{|s_2|} + \frac{m-t}{m}\right)$$

Where: $d_j$ is the Jaro distance
m is the number of matching characters (characters that appear in $s_1$ and in $s_2$)
t is half the number of transpositions (compare the i-th character of $s_1$ and the i-th character of $s_2$ divided by 2)
$|s_1|$ is the length of the first string
$|s_2|$ is the length of the second string The Jaro-Winkler similarity algorithm uses a prefix scale p which gives more favorable ratings to strings that match from the beginning for a set prefix length 1.

$$d_w = d_j + (lp(1-d_j))$$

Where: p is a constant scaling factor for how much the score is adjusted upwards for having common prefixes. The standard value for this constant in Winkler's work is p=0.1
l is the length of common prefix at the start of the string (up to a maximum of 4 characters)

The Hamming distance is the number of positions with different symbols in both strings. In other words, it measures the minimum number of substitutions required to change one string into the other, or the minimum number of errors that could have transformed one string into the other. Only defined for strings of equal length. For instance, distance ('abcdd','abbcd')=3.

Figure 2B:
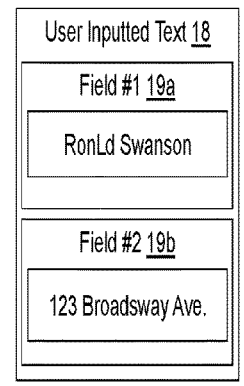
Figure 2B:
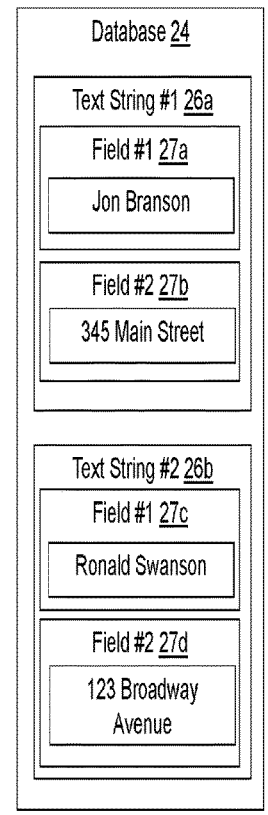

As shown in FIG. 2B, the user inputted text 18, and each of the plurality of text strings 26 may include multiple strings corresponding to multiple fields 19a,19b,27a,27b, 27c,27d, where each string of the multiple strings corresponds to a field of the multiple fields 19a,19b, 27a,27b, 27c,27d. When multiple fields 19a,19b,27a,27b,27c,27d are present, comparing the user inputted text 18 to the plurality of text strings 26 may include comparing the user inputted text 18 in a given text field 19a, 19b to the text string in the same given text field 27a,27b,27c,27d. Fields not shared between the user inputted text 18 and a given text string 26 may be disregarded.

The maximum difference threshold (string similarity threshold), and/or the maximum keyboard distance threshold may be increased based on the number of different fields in which a match is found between the user inputted text 18 and the text string 26.

When the string similarity score is zero, the user inputted text 18 and the text string 26 are an exact match and the processor 20 is configured to identify the user inputted text 18 as a match with the text string 26. Alternatively, when the string similarity score is greater than a maximum difference threshold the processor 20 is configured to identify the text string 26 as not a match to the user inputted text 18.

The maximum difference threshold may be set as a predetermined number. Alternatively, the maximum difference threshold may be adjusted based on the number of characters or the number of words in the user inputted text 18 or in the text string 26.

For example, the maximum difference threshold may be adjusted based on the length of the user inputted text 18, such that user inputted text having a longer length has a larger maximum difference threshold than user inputted text 18 having a shorter length. As will be understood by one of ordinary skill in the art, the maximum difference threshold may be determined or varied in any suitable matter to adjust for the user inputted text 18 and the text string 26 being compared.

When the determined string similarity score is greater than zero but less than a maximum difference threshold, the processor 20 is configured to determine the character(s) differing between the user inputted text 18 and the text string 26. Each of the determined differing characters comprise a mismatching character pair including a mismatching character in the text string 26 (text string character) and a corresponding mismatching character in the user inputted text 18 (user inputted text character).

For each mismatching character pair, processor 20 is configured to determine a keyboard distance between the mismatching character in the text string 26 and the corresponding mismatching character in the user inputted text 18. The keyboard distance corresponds to a physical distance on a keyboard between the two mismatching characters. For example, the "F" key and the "D" key may have a distance of one, because they are directly adjacent to one another on a standard QWERTY keyboard. Similarly, a "J" key and an "L" key may have a distance of two, because the two keys are separate by the "K" key.

Because the keyboard distance corresponds to a physical distance on a keyboard between the keys, the keyboard distance algorithm may receive as an input the layout of keys on the input device. The keyboard distance algorithm may use the layout of the keys in order to determine the keyboard distance between two keys.

The keyboard distance may be determined in any suitable manner. For example, the keyboard distance may be determined by counting the number of key movements required to move from one key to another, the physical distance between the two keys on a standard keyboard (e.g., in cm or inches), or using any suitable metric. As an example, to move to the "T" key from "W", three key movements are required (from "W" to "E", from "E" to "R", and from "R" to "T").

The keyboard algorithm may restrict movement between keys to exclude diagonal movement. Alternatively, the keyboard algorithm may allow diagonal movement between keys. For example, when comparing the "W" and "D" keys, if diagonal movement is not allowed, then the keys would be two key movements apart (from "W" to "S" and from "S" to "D"). Alternatively, if diagonal movement is allowed, then the "W" and "D" keys would only be one key movement apart (from "W" to "D").

The keyboard distance algorithm may also take into consideration whether the keys being compared are typed using the same finger. For example, the keyboard distance may be determined as described above and then multiplied by a weighting factor. The weighting factor for keys typed using the same finger may be lower than keys typed using a different finger. Additionally, the weighting factor may also increase based on the number of fingers between the fingers used to type the two compared keys. For example, the "r" key is typed with the left index finger and the "a" key is typed with the left pinky finger. The weight applied to this comparison may be larger than the weight used when comparing keys typed with the index finger and the middle finger.

Returning to the example in FIG. 2A, the Levenshtein distance between "Ron Swanson" and "Jon Branson" is three. If the maximum keyboard distance threshold is four, then the processor would determine the keyboard distance between the mismatching characters. When comparing "Ron Swanson" and "Jon Branson", the keyboard distance between "R" and "J" is three (assuming diagonal movement is used to determine the keyboard distance), the keyboard distance between "S" and "B" is three (again assuming that diagonal movement is used).

In some cases, the mismatching character pair may include a character and a missing character. For example, in FIG. 2B, "Ronld Swanson" is compared to "Ronald Swanson". In this example, the "a" in "Ronald" does not have a matching character in that "a" was left out of "Ronld" (presumably because the user accidentally hit the "shift key" instead of "a" resulting in a capital "L" instead of a lower case "l"). For this reason, for a given mismatching character pair, either the mismatching character in the text string 26 or the corresponding mismatching character in the user inputted text 18 may be a missing character.

When a missing character is one of the characters in the mismatching character pair, the keyboard distance between the missing character and the non-missing character comprises the distance between the non-missing character and a character adjacent to the non-missing character. The adjacent character may be from the user inputted text 18 when the non-missing character is from the user inputted text 18 or the text string 26 when the non-missing character is from the text string 26. For example, when comparing "Ronsald" and "Ronald", the mismatching character pair is a missing character and "s". In this example, the keyboard distance would be the keyboard distance between "s" and "n" or "a" (the adjacent characters in "Ronsald").

The keyboard distance between the non-missing character and the adjacent character may be the minimum of the distance between the non-missing character ("s" in the above example) and a character immediately preceding the non-missing character ("n" in the above example) or a character immediately following the non-missing character ("a" in the above example). In the above example, the keyboard distance would be the minimum of 5 (the keyboard distance between "n" and "s") and 1 (the keyboard distance between "a" and "s"). Using the keyboard distance between the non-missing character and the adjacent character can be used to compensate for a user accidentally hitting two characters ("sa" in the above example) instead of only one key ("a" in the above example).

Alternatively, the keyboard distance between the missing character and the non-missing character may be set equal to a predetermined value. For example, the predetermined value may be set equal to 1.0, 1.5, 2.0, 2,5, 3.0, or any suitable value.

In addition to or in the alternative to compensating for a user hitting two keys by using the keyboard distance algorithm (as described in the previous paragraphs), comparing the user inputted text 18 to one of the plurality of text strings 26 may include combining two characters within the user inputted text into a single character in order to account for a user mistakenly hitting two keys when attempting to press one key. The two characters may be combined when the two characters are located adjacent to one another on the keyboard and when the two characters are located adjacent to one another in the user inputted text 18.

When combining two characters, the keyboard distance between the combined two characters and the other character in the mismatching character pair may be equal to the minimum of the keyboard distance between a first of the two combined characters and the other character in the mismatching character pair and the keyboard distance between a second of the two combined characters and the other character in the mismatching character pair.

One character may also be split into two characters when comparing the user inputted text 18 to one of the plurality of text strings 26. For example, in FIG. 2B the user mistakenly hit the "shift key" instead of the "a" key when typing "Ronald", resulting in "Ronld" being stored in the user inputted text 18. For this reason, the comparing may include splitting a capitalized character into two characters equal to the "shift key" and a lower case version of the capitalized character ("l" in this example). In this example, the mismatching character pair would be the "shift key" (from "Ronld") and the "a" key (from "Ronald"). Alternatively, the case of the user inputted text 18 and the text strings 26 may be ignored.

When the keyboard distance determined for each mismatching character pair is less than a maximum keyboard distance threshold, the processor 20 is configured to identify the user inputted text 18 and the text string 26 as a match. The maximum keyboard distance threshold may be set to any suitable number. For example, the keyboard distance may be 1 or 2 if diagonal characters are used to determine the keyboard distance. Similarly, the keyboard distance may be 1, 2, or 3 if diagonal characters are not used to determine the keyboard distance.

The maximum keyboard distance threshold may be set as a predetermined number. Alternatively, the maximum keyboard distance threshold may be adjusted based on the number of keys or the number of words in the user inputted text 18 or in the text string 26. For example, the maximum keyboard distance threshold may be adjusted based on the length of the user inputted text 18, such that user inputted text 18 having a longer length has a larger maximum keyboard distance threshold than user inputted text 18 having a shorter length. As will be understood by one of ordinary skill in the art, the maximum keyboard distance threshold may be determined or varied in any suitable matter to adjust for the user inputted text 18 and the text string 26 being compared.

In one embodiment, prior to identifying the user inputted text 18 and the text string 26 as a match when the keyboard distance determined for each mismatching character pair is less than the maximum keyboard distance threshold, the processor 20 may determine whether a sum of all of the keyboard distances determined for each mismatching character pair is less than a maximum total keyboard distance threshold. Only when the sum of all of the keyboard distances is less than the maximum total keyboard distance threshold, then the processor may identify the user inputted text 18 and the text string 26 as a match. As described above regarding the maximum keyboard distance threshold, the maximum total keyboard distance threshold may be set as a predetermined number, it may be adjusted based on the number of keys or the number of words in the user inputted text 18 or in the text string 26, or it may be set in any suitable manner.

After comparing the user inputted text 18 to the plurality of text strings 26, the processor 20 outputs information regarding whether the user inputted text 18 matches any of the plurality of text strings 26.

When the user inputted text 18 is identified as a match to a particular text string of the plurality of text strings 26, data 21 included with the user inputted text 18 is stored as data 28a,28b associated with the particular text string 26.

The comparing of the user inputted text 18 to the plurality of text strings 26 may be stopped when the user inputted text 18 and one of the plurality of text strings 26 is identified as a match. Alternatively, the comparing of the user inputted text 18 to the plurality of text strings 26 may continue when the user inputted text 18 and the text string 26 are identified as a match. In this way, multiple matches may be found between the user inputted text 18 and the plurality of text strings 26. If multiple matches are found, a single text string of the matching text strings may be identified as a match and the remaining matching text strings may be identified as not a match. For example, the single text string of the matching text strings 26 identified as a match may be selected based on the sum of the keyboard distance, the string similarity score, or a combination of the keyboard distance and the string similarity score of the text string 26 and the user inputted text 18. As an example, the matching text string 26 having the lowest string similarity score relative to the user inputted text 18 may be selected. If there is a tie where two matching text strings have the same string similarity score that is the lowest of the matching text strings 26, the sum of the keyboard distance for the two matching text strings and the user inputted text 18 may be used as a tie-breaker, such that the matching text string having the lowest keyboard distance of the two matching text strings may be selected as a match.

When the user inputted text 18 is identified as not matching any of the plurality of text strings 26, the user inputted text 18 may be stored as a new text string of the plurality of text strings 26. When storing user inputted text 18 as a new text string 26, data 21 associated with the user inputted text 18 may be stored as data 28a, 28b associated with the new text string 26.

As opposed to simply identifying a text string 26 as a match or not a match, a distinction may be made between an exact match and a probable match. That is when the determined string similarity score is zero, the user inputted text 18 and the text string 26 may be identified as an exact match. Similarly, when the determined string similarity score is greater than zero and less than a maximum difference threshold and the keyboard distance determined for each mismatching character pair is less than a maximum keyboard distance threshold, the user inputted text and the text string may be identified as a probable match.

One problem with matching user inputted text 18 to stored text strings 26 is that the user inputted text 18 or the text strings 26 may include abbreviations or synonyms that cause issues during matching. For example, in FIG. 2A "Ron Swanson" is being compared to "Ronald Swanson". In order to ensure that "Ron" and "Ronald" are identified as a match (or an exact match), a secondary database 32 storing a plurality of synonyms 34 may be accessed by the processor 20. The secondary database 32 may be stored on the non-transitory computer-readable medium 22. Each synonym 34 may include a replacement string corresponding to a main string.

When using the secondary database 32, as opposed to only comparing the user inputted text 18 and the text string 26, the comparison further includes generating at least one replacement text string. The at least one replacement text string is generated by replacing at least one portion of the text string 26 or user inputted text 18 that matches a main string of a synonym 34 with the corresponding replacement string stored in the synonym 34. For example, in FIG. 2A, "Ronald" in "Ronald Swanson" would be replaced with "Ron" to form "Ron Swanson" using a synonym specifying "Ronald" as a main string and "Ron" as a replacement string. The user inputted text 18 and the text string 26 are determined to match if the user inputted text 18 matches either the stored text 26 ("Ronald Swanson") or the at least one replacement text string ("Ron Swanson").

The secondary database 32 of synonyms 34 may be automatically generated. For example, the user inputted text 18 and each of the plurality of text strings 26 may include multiple strings corresponding to multiple fields 19a,19b, 27a,27b,27c,27d, where each string of the multiple strings corresponds to a field of the multiple fields 19a,19b,27a, 27b,27c,27d. In this case, comparing the user inputted text 18 to the plurality of text strings 26 includes comparing the user inputted text 18 in a given text field 19a, 19b to the text string 26 in the same given text field 27 of the text string 26. When a total number of fields 19a,19b,27a,27b,27c,27d in which an exact match is found between the user inputted text 18 and a text string 26, any field 19a, 19b, 27a,27b,27c,27d in which the user inputted text 18 is determined to match the text string 26, but the match is not an exact match, then the user inputted text 18 for the field is stored as a synonym 34 for the matching field 27a,27b,27c,27d of the text string 26.

Figure 3:
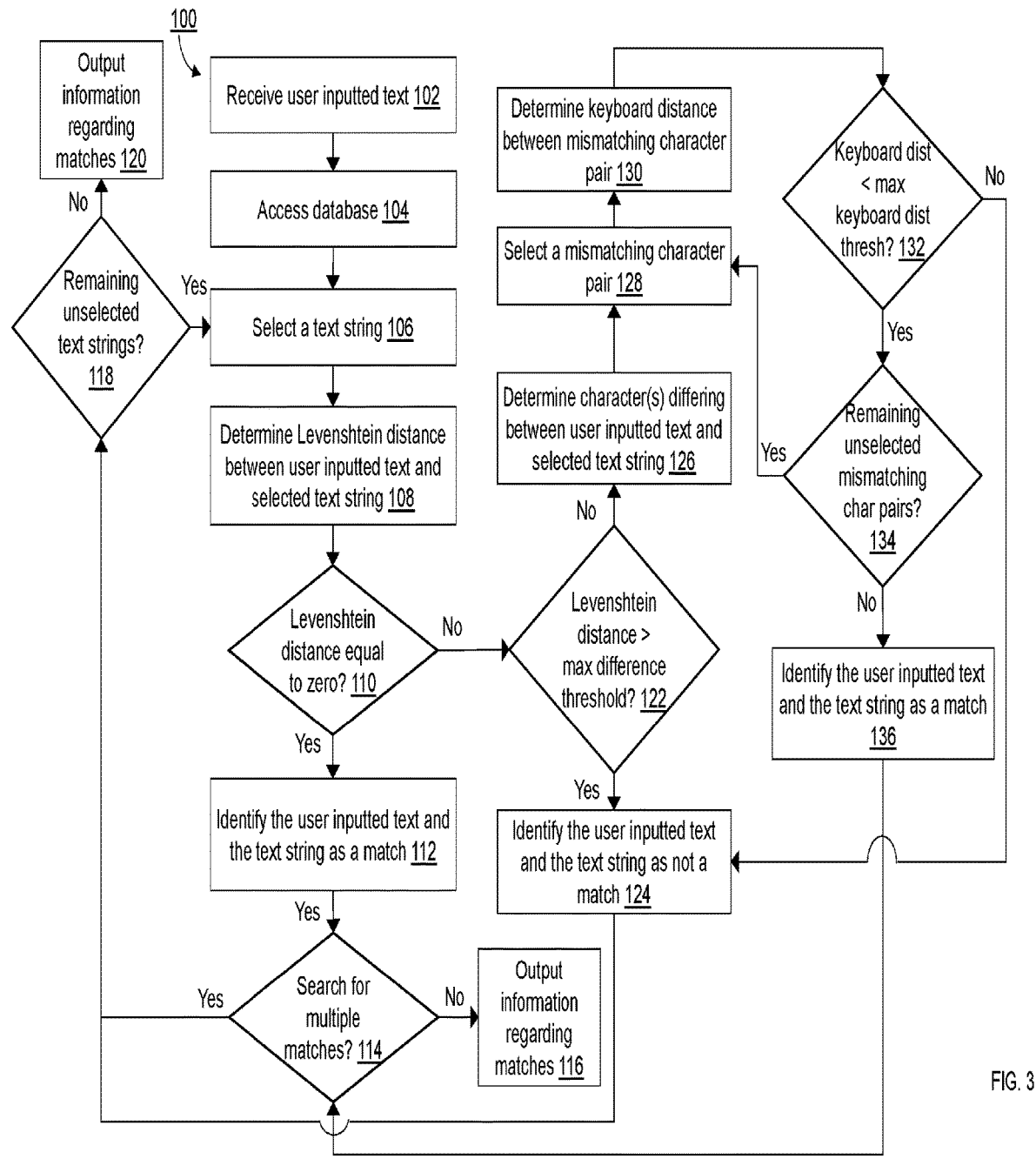
FIG. 3 is a flow diagram representing a computer-implemented method for matching user inputted text to stored text.

Turning to FIG. 3, a block diagram is shown depicting a computer-implemented method 100 for matching user inputted text 18 to stored text 26. The computer-implemented method 100 may be performed by the host device 12 (e.g., the processor 20 of the host device 12).

In process block 102, the user inputted text 18 is received. In process block 104, the database 24 including the plurality of text strings 26 is accessed. In process block 106, comparing the user inputted text 18 to the plurality of text strings 26 to determine potential matches between the user inputted text 18 and the plurality of text strings 26 begins.

In process block 106, a text string 26 of the plurality of text strings 26 is selected. In process block 108, a string similarity score between the user inputted text 18 and the selected text string 26 is determined. In the decision block 110, it is determined whether the string similarity score is equal to zero. If the string similarity score is equal to zero, then processing continues to process block 112. In process block 112, the user inputted text 18, and the text string are identified as a match. As described above, the user inputted text 18 and the text string 26 may be identified as an exact match.

In the decision block 114, it is determined whether the method is searching for multiple matches. If multiple matches are not being searched for, then information regarding whether the user inputted text 18 matches any of the plurality of text strings 26 is output in process block 116. If multiple matches are being searched for, then processing moves to decision block 118. In the decision block 118, a determination is made regarding whether there remain any unselected text strings 26. If there are no remaining unselected text strings 26, then information regarding whether the user inputted text 18 matches any of the plurality of text strings 26 is output in process block 120. This output information could be a binary match/no match value, or it could be a tri-state value (match, no match, partial match). In another embodiment, the output from process block 120 could be a confidence score on the level of matching. This confidence score could be the sum (or average) of the string similarity score with the keyboard distance score. The confidence score is an indication of how confident the machine learning algorithms (the keyboard distance algorithm and the string similarity algorithm) are of the match between the two strings. However, if there are remaining unselected text strings 26, then a new text string 26 is selected in process block 106.

If the string similarity score is not equal to zero in the decision block 110, then processing moves to decision block 122. In the decision block 122, a check is made to determine if the string similarity score is greater than the maximum difference threshold. If the string similarity score is greater than the maximum difference threshold, then the text string 26 is identified as not a match to the user inputted text 18 in process block 124. Following process block 124, processing moves to decision block 118 to determine if there are any remaining unselected text strings 26 as described above. Essentially, this is a loop looping through all of the text strings 24 in the plurality of text strings 24. If there is no match, the next text string is checked.

If the string similarity score is not greater than the maximum difference threshold in processing block 122, then the string similarity score is greater than zero but less than the maximum difference threshold. In this case, processing moves to process block 126.

In process block 126, the computer-implemented method determines at least one-character differing between the user inputted text 18 and the text string 26. As described previously, the determined at least one differing character comprises a mismatching character pair including a mismatching character in the text string 26 and a corresponding mismatching character in the user inputted text 18. In process block 128, a mismatching character pair is selected. In process block 130, a keyboard distance between the mismatching character in the text string 26 and the corresponding mismatching character in the user inputted text 18 is determined.

In the decision block 132, a check is performed to determine if the keyboard distance is less than the maximum keyboard distance threshold. If the keyboard distance is greater than or equal to the maximum keyboard distance threshold, then the user inputted text 18 and the text string are identified as not a match in process block 124. If the keyboard distance is less than the maximum keyboard distance threshold, then a check is performed in the decision block 134 to determine if there are any remaining unselected mismatching character pairs. If there are any unselected mismatching character pairs, then a new mismatching character pair is selected in process block 128. If there are no remaining unselected mismatching character pairs, then the user inputted text 18 and the text string 26 are identified as a match in process block 136. Following process block 136, processing moves to decision block 114.

As will be understood by one of ordinary skill in the art, the host device 12 and/or accessing device 14 may be a computer system of one or more computers, servers, etc. The combination of the host device 12 and accessing device 14 may also be embodied as a single device (e.g., a single computer or server). The host device 12 and/or accessing device 14 may comprise a cellular phone, smartphone, tablet, mobile computer, desktop computer, laptop, or any other suitable computer apparatus capable of executing the method for matching user inputted text 18 to stored text. The host device 12 and the accessing device 14 each include at least a processor, a network interface, and a non-transitory computer-readable medium 22, 52. The computer-readable medium 22, 52 may include encoded thereon instructions for interfacing with the corresponding network interface 40, 54, and reading and writing data to the corresponding computer-readable medium 22, 52. The computer-readable medium 22, 52 may also include computer programs comprising instructions embodied thereon that are executed by the corresponding processor 20, 50.

As will be understood by one of ordinary skill in the art, the host device 12 and the accessing device 14 may communicate with one another using any suitable method. For example, the host device 12 and the accessing device 14 may communicate over a local area network (LAN), a Bluetooth Network, or the Internet.

Data (e.g., the user inputted text 18 and associated data 19*a*, 19*b*) may be transferred over a network 44 connecting the host device 12 and the accessing device 14. The network 44 may be at least one of a TCP/IP network or a system bus. As will be understood by one of ordinary skill in the art, the transmission of data between the host device 12 and the accessing device 14 may be performed using any suitable protocol (e.g., TCP/IP, Bluetooth, SMTP, HTTP, SSL, PPP, IMAP, or any other suitable network protocol). The accessing device 14 may also comprise a keyboard or similar input device connected to the host device 12.

As will be understood by one of ordinary skill in the art, the processors 20, 50 of the host device 12 and accessing device 14 may have various implementations. For example, each of the processors 20, 50 may include any suitable device, such as a programmable circuit, integrated circuit, memory and I/O circuits, an application-specific integrated circuit, microcontroller, complex programmable logic device, other programmable circuits, or the like. Each of the processors 20, 50 may also include a non-transitory computer-readable medium, such as random access memory (RAM), a read-only memory (ROM), an erasable programmable read-only memory (EPROM or Flash memory), or any other suitable medium. Instructions for performing the methods described above may be stored in the non-transitory computer-readable medium and executed by the respective processor 20, 50 identified in the description of the method. Each of the processors 20, 50 may be communicatively coupled (electrically, optically, mechanically, and/or wirelessly) to the respective computer-readable medium 22, 52, and network interface 40, 54 through a system bus, motherboard, or using any other suitable structure known in the art.

The network interfaces 40, 54 of the host device 12, and accessing device 14 may each be communicatively coupled to one or more other host devices 12 and accessing devices 14. The network 44 may be an open network, such as the Internet, a private network, such as a virtual private network, or any other suitable network. Each of the network interface 40, 54 may be configured to transmit and/or receive data.

As will be understood by one of ordinary skill in the art, each of the network interfaces 40, 54 may comprise a wireless network adaptor, an Ethernet network card, or any suitable device for performing network-based communication between devices. Each of the network interfaces 40, 54 may be communicatively coupled to the respective computer-readable medium 22, 52 such that each network interface 40, 54 is able to send data stored on the respective computer-readable medium 22, 52 across the network 44 and store received data on the respective computer-readable medium 22, 52. Each of the network interface 40, 54 may also be communicatively coupled to the respective processor 20, 50 such that the processor is able to control operation of the network interface 40, 54. The respective network interfaces 40, 54, computer-readable medium 22, 52, and processors 20, 50 may be communicatively coupled through a system bus, motherboard, or using any other suitable manner as will be understood by one of ordinary skill in the art.

Although the inventions are shown and described with respect to certain exemplary embodiments, it is obvious that equivalents and modifications will occur to others skilled in the art upon the reading and understanding of the specification. It is envisioned that after reading and understanding the present inventions those skilled in the art may envision other processing states, events, and processing steps to further the objectives of the system of the present inventions. The present inventions include all such equivalents and modifications, and is limited only by the scope of the following claims.

The invention claimed is:

1. A method for matching an input text to stored text, the method comprising:
accessing a database including a plurality of text strings;
comparing the input text to the plurality of text strings to determine potential matches between the input text and the plurality of text strings, wherein the comparing comprises:
looping through each text string of the plurality of text strings:
determining a string similarity score between the input text and the text string,
when the string similarity score indicates an exact match, identifying the input text and the text string as matching;
when the string similarity score is greater than or equal to a string similarity threshold, continuing looping with a next text string;
when the string similarity score is greater than zero but less than the string similarity threshold:
determining at least one character differing between the input text and the text string, wherein the at least one differing character comprises a mismatching character pair including a mismatching character in the text string and a corresponding mismatching character in the input text;
for each mismatching character pair, determine a keyboard distance between the mismatching character in the text string and the corresponding mismatching character in the input text, wherein the keyboard distance corresponds to a physical distance on a keyboard between the two mismatching characters;
when, for a given mismatching character pair, either the mismatching character in the text string or the corresponding mismatching character in the input text comprises a missing character, and the given mismatching character pair including the missing character and a non-missing character, the keyboard distance is a distance between the missing character and the non-missing character comprises the distance between the non-missing character and a character adjacent to the non-missing character; and
when the keyboard distance determined for each mismatching character pair is less than a maximum keyboard distance threshold, identifying the input text and the text string as matching;
when all of the text strings are compared without a match to the input text, identifying the input text as non-matching.

2. The method of claim 1, wherein the string similarity score is calculated using a Damerau-Levenshtein distance algorithm.

3. The method of claim 1, wherein the string similarity score is calculated using a Jaro-Winkler algorithm.

4. The method of claim 1, wherein the string similarity score is calculated using a Cosine similarity algorithm.

5. The method of claim 1, wherein the string similarity score is calculated using a plurality of string similarity algorithms.

6. The method of claim 1, wherein the identifying of the input text and the text string as matching further comprises returning a confidence score.

7. The method of claim 6 wherein the confidence score is an average of the string similarity score and the keyboard distance.

8. The method of claim 1 wherein the identifying of the input text and the text string as matching further comprises returning a tri-state value.

9. The method of claim 1, wherein the keyboard distance between the non-missing character and the adjacent character comprises a minimum of the distance between the non-missing character and the adjacent character immediately preceding the non-missing character or the adjacent character immediately following the non-missing character.

10. The method of claim 1, wherein for the given mismatching character pair including the missing character and the non-missing character, the keyboard distance between the missing character and the non-missing character is set equal to a predetermined value.

11. The method of claim 1, the comparing further includes, within the input text, combining two characters into a single character to account for a user mistakenly hitting two keys when attempting to press one key when the two characters are located adjacent to one another on the keyboard and the two characters are located adjacent to one another in the input text.

12. An apparatus for improving automated matching of user inputted text to a database of text strings, the apparatus comprising:
an input device configured to receive the user inputted text;
a memory electrically connected to the input device, said memory storing the user inputted text and the database of the text strings;
a processor, electrically connected to the memory and to the input device, where the processor is configured to accept the user inputted text and place the user inputted text in the memory, and then loop through each text string in the database, comparing a string similarity score between the text string and the user inputted text, and
if the string similarity score indicates an exact match, a match is outputted by the processor;
if the string similarity score is greater than or equal to a string similarity threshold, continuing the loop of each text string with a next text string in the database; and
if the string similarity score is less than the string similarity threshold, looping through each character of the text string and the user inputted text until a mismatch between a text string character and a user inputted text character is found, and determining a keyboard distance between the text string character and the user inputted text character,
if the keyboard distance is greater than or equal to a keyboard distance threshold, continuing the loop of each text string with the next text string in the database;
if the keyboard distance is less than the keyboard distance threshold, continuing the loop through each character of the text string and the user inputted text;

until each character of the text string and the user inputted text has been compared, upon which the match is outputted by the processor;

until each text string in the database is compared, upon which a non-match is outputted by the processor.

13. The apparatus of claim 12, wherein the string similarity score is calculated using a Damerau-Levenshtein distance algorithm.

14. The apparatus of claim 12, wherein the string similarity score is calculated using a Jaro-Winkler algorithm.

15. The apparatus of claim 12, wherein the string similarity score is calculated using a Cosine similarity algorithm.

16. The apparatus of claim 12, wherein the string similarity score is calculated using a plurality of string similarity algorithms.

17. The apparatus of claim 12, wherein the match is a confidence score.

18. The apparatus of claim 17 wherein the confidence score is a sum of the string similarity score and the keyboard distance.

19. The apparatus of claim 12, wherein prior to identifying the user inputted text and the text string as the match when the keyboard distance determined for each mismatching character pair is less than a maximum keyboard distance threshold, determining whether a sum of all of the keyboard distances determined for each mismatching character pair is less than a maximum total keyboard distance threshold and, only when the sum of all of the keyboard distances is less than the maximum total keyboard distance threshold, identifying the user inputted text and the text string as the match.

20. The apparatus of claim 12, wherein a comparison between the text string character and the user inputted text character further includes combining two characters within the user inputted text into a single character to account for the user mistakenly hitting two keys when attempting to press one key when the two characters are located adjacent one another on the keyboard and the two characters are located adjacent to one another in the user inputted text.

* * * * *